United States Patent
Muramatsu

(10) Patent No.: US 6,850,347 B2
(45) Date of Patent: Feb. 1, 2005

(54) SCANNING MODULE

(75) Inventor: Shigeki Muramatsu, Kakegawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/644,855

(22) Filed: Aug. 21, 2003

(65) Prior Publication Data
US 2004/0036935 A1 Feb. 26, 2004

(30) Foreign Application Priority Data
Aug. 23, 2002 (JP) ........................................ 2002-242880

(51) Int. Cl.$^7$ ............................................... G02B 26/08
(52) U.S. Cl. ...................................... 359/196; 359/212
(58) Field of Search ................................ 359/196, 197, 359/205, 212, 850, 857, 862, 863

(56) References Cited

U.S. PATENT DOCUMENTS 6,144,475 A * 11/2000 Sheng ......................... 359/196
6,147,343 A * 11/2000 Christensen ................. 250/234

FOREIGN PATENT DOCUMENTS

| JP | 3-10564 | 1/1991 |
|----|---------|--------|
| JP | 7-56242 | 3/1995 |
| JP | 7-170376 | 7/1995 |
| JP | 9-163098 | 6/1997 |
| JP | 11-146131 | 5/1999 |
| JP | 2001-174932 | 6/2001 |

* cited by examiner

*Primary Examiner*—Euncha P. Cherry
(74) *Attorney, Agent, or Firm*—Young & Thompson

(57) ABSTRACT

A scanning module of the present invention includes a light source for illuminating a document. Light reflected by the document is incident to a first and a second mirror provided in a pair. The two mirrors reflect the light a plurality of times therebetween and then output it as light reflected from the first mirror. Subsequently, a third and a fourth mirror sequentially reflect the light along a path including a lens. A fifth mirror reflects the light incident thereto from the lens. A linear sensor is spaced from the fifth mirror by a preselected distance such that the light passed through the lens is focused on the linear sensor. The first and second mirrors are adjustable in position on a path, extending from the document to the first mirror, while maintaining a positional relation therebetween.

10 Claims, 8 Drawing Sheets

SCANNING MODULE

BACKGROUND OF THE INVENTION

1. Field of the Invention

The present invention relates to a scanning module for reading a document image and outputting an electric signal representative of the document image and more particularly to a miniature, simple scanning module whose optical path length is easily adjustable.

2. Description of the Background Art

It is a common practice with a copier or similar image forming apparatus to use a scanning system of the type including a stationary line sensor and two carriages that move at full speed and half speed, respectively. This type of scanning system, conventional with an analog scanner, is not always desirable when it comes to the miniaturization and the reduction of production cost of a scanner.

A current trend in the imaging art is toward a scanner in which a line sensor, a lens, a lamp and so forth are constructed into a single movable scanning module in order to reduce production cost. The prerequisite with this type of scanner is that to focus imagewise reflection from a document on the line sensor in a preselected magnification, an optical path extending from the document to the line sensor be provided with a preselected length. This gives rise to a problem that the scanning module is bulky when provided with the preselected optical path length. While the scanning module may be reduced in size by use of a miniature lens having small optical path length, such a lens aggravates aberration and therefore prevents a beam from a document from being focused on the line sensor, resulting in low image quality.

In light of the above, it has been proposed to reduce the size of a scanning module by folding an optical path with, e.g., mirrors. Japanese Patent Laid-Open Publication No. 2001-174932, for example, discloses an image scanner including one or more multiple-reflection mirrors that reflect a beam from a document a plurality of times, so that necessary optical path length is implemented by a small number of mirrors (Prior Art 1 hereinafter).

Japanese Patent Laid-Open Publication No. 3-10564 teaches an image scanner including a transparent member configured to bend light incident from a document a plurality of times (Prior Art 2 hereinafter). Prior Art 2 implements necessary optical path length while reducing space necessary for reflected light.

Further, Japanese Patent Laid-Open Publication Nos. 7-170376 (Prior Art 3 hereinafter) and 9-163098 proposes an optical unit (Prior Art 4 hereinafter) each propose an optical unit including a pair of mirrors configured to reflect light incident from a document a plurality of times. Prior Arts 3 and 4 each contemplate to reduce the size of an optical unit while guaranteeing required optical path length.

Generally, scanners with reduction optical systems must be individually adjusted in optical path length between a focus on a document and a line sensor in order to accurately establish a designed optical magnification.

Prior Arts 1 through 4 described above have the following problems unsolved although contemplating to guarantee optical path length and reduce module size at the same time.

Prior Art 1 has a problem that optical path length cannot be adjusted unless a plurality of mirrors, including the multiple-reflection mirrors, are adjusted in position one by one, resulting in sophisticated adjustment. Further, in Prior Art 1, the distance between the mirror to which a beam from a document is incident first and a glass platen is selected to be smaller than the vertical distance between the optical axis of a lens and the glass platen. On the other hand, to accommodate great optical path length, the optical path between the document and the mirror to which the beam from the document is incident first should preferably have great length. In this respect, the structure taught in Prior Art 1 is not adequate from the size reduction standpoint.

As for Prior Art 2, it is likely that incident light or reflected light is refracted at the interface between the transparent member and the air due to a difference in refractive index. To obviate such refraction, light must be input to and output from the above interface perpendicularly to the interface. Therefore, when the position of the transparent member is varied, the mirrors, lens and image sensor must also be adjusted in position, resulting in sophisticated adjustment of optical path length. Further, because the transparent member bends incident light a plurality of times to thereby fold the optical path, it is difficult to reduce the size of the mirror to which light from a document is incident first and the size of the transparent member. This configuration is therefore not adequate from the size reduction standpoint.

Prior Art 3 does not allow optical path length to be easily adjusted because all the mirrors, including the pair of mirrors, must be individually varied in position. Moreover, light propagated through the lens crosses the optical path between the pair of mirrors, so that the pair of mirrors must be enclosed by a case capable of intercepting extraneous light, obstructing size and cost reduction of the module.

Prior Art 4 has the same problem as Prior Art 3 as to the adjustment of optical path length stated above. In addition, Prior Art 4 has another problem that the lens, having a small focal distance and used to reduce module size, needs high accuracy, obstructing cost reduction of the module.

As for the scanning system using a stationary line sensor and a full-speed and a half-speed carriage, as stated earlier, Japanese Patent Laid-Open Publication No. 11-146131 discloses an image scanner and an image forming apparatus configured to adjust optical path length by shifting only a mirror that reflects light toward reading means (Prior Art 5 hereinafter). However, Prior Art 5 is not applicable to a scanner of the type having a line sensor, lens, lamp and so forth constructed into a single movable module. Further, Prior Art 5 adjusts optical path length by moving a second mirror, which is originally movable in the scanning direction, i.e., without using any exclusive member for the adjustment. That is, Prior Art 5 simply controls the movement of the half-speed carriage in the conventional scanner.

Japanese Patent Laid-Open Publication No. 7-56242 teaches an image scanning unit of the type folding an optical path by reflecting light from a document with, e.g., mirrors (Prior Art 6 hereinafter). To facilitate the adjustment of optical path length, Prior Art 6 uses a lens and an image pickup section constructed integrally with each other and movable along an optical path. This, according to the above document, allows magnification to be easily adjusted.

Prior Art 6, however, needs an exclusive mechanism for moving only the lens along the optical axis and an exclusive mechanism for moving a lens unit, including the lens and image pickup section, along the optical axis. Further, Prior Art 6 needs a mechanism for affixing the lens and lens unit at desired positions. A module with such mechanisms is sophisticated in structure and cannot be reduced in size. Moreover, the adjustment of optical path length effected by moving the lens and image pickup section together needs a large margin for adjustment because the amount of displacement and the amount of variation of optical path length are equal to each other.

As stated above, as for a scanning system of the type including a line sensor, a lens, a lamp and so forth constructed into a single movable module, none of Prior Arts 1 through 6 realizes a simple, compact module allowing its optical path length to be easily adjusted.

SUMMARY OF THE INVENTION

It is an object of the present invention to provide a simple, miniature scanning module allowing its optical path length to be easily adjusted.

A scanning module of the present invention includes a light source for illuminating a document. A pair of mirrors consist of a first mirror to which light reflected by the document is incident and a second mirror positioned substantially parallel to and spaced by a preselected distance from the first mirror. The pair of mirrors reflects the light a plurality of times therebetween and then output it as light reflected from the first mirror. A third mirror reflects the reflected light from the pair of mirror away from the pair of mirrors in substantially parallel to the document. A fourth mirror reflects the light incident from the third mirror toward a lens in a direction substantially opposite to a direction in which it is reflected from the pair of mirrors to the third mirror. A fifth mirror reflects the light incident from the lens in a direction substantially opposite to a direction in which it is reflected from the third mirror to the fourth mirror. A linear sensor is spaced from the fifth mirror by a preselected distance such that the light passed through the lens is focused on the linear sensor. The pair of mirrors are adjustable in position on a path, extending from the document to the first mirror, while maintaining a positional relation therebetween.

If desired, the pair of mirrors, reflected the light a plurality of times therebetween, may output it as light reflected from the second mirror.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
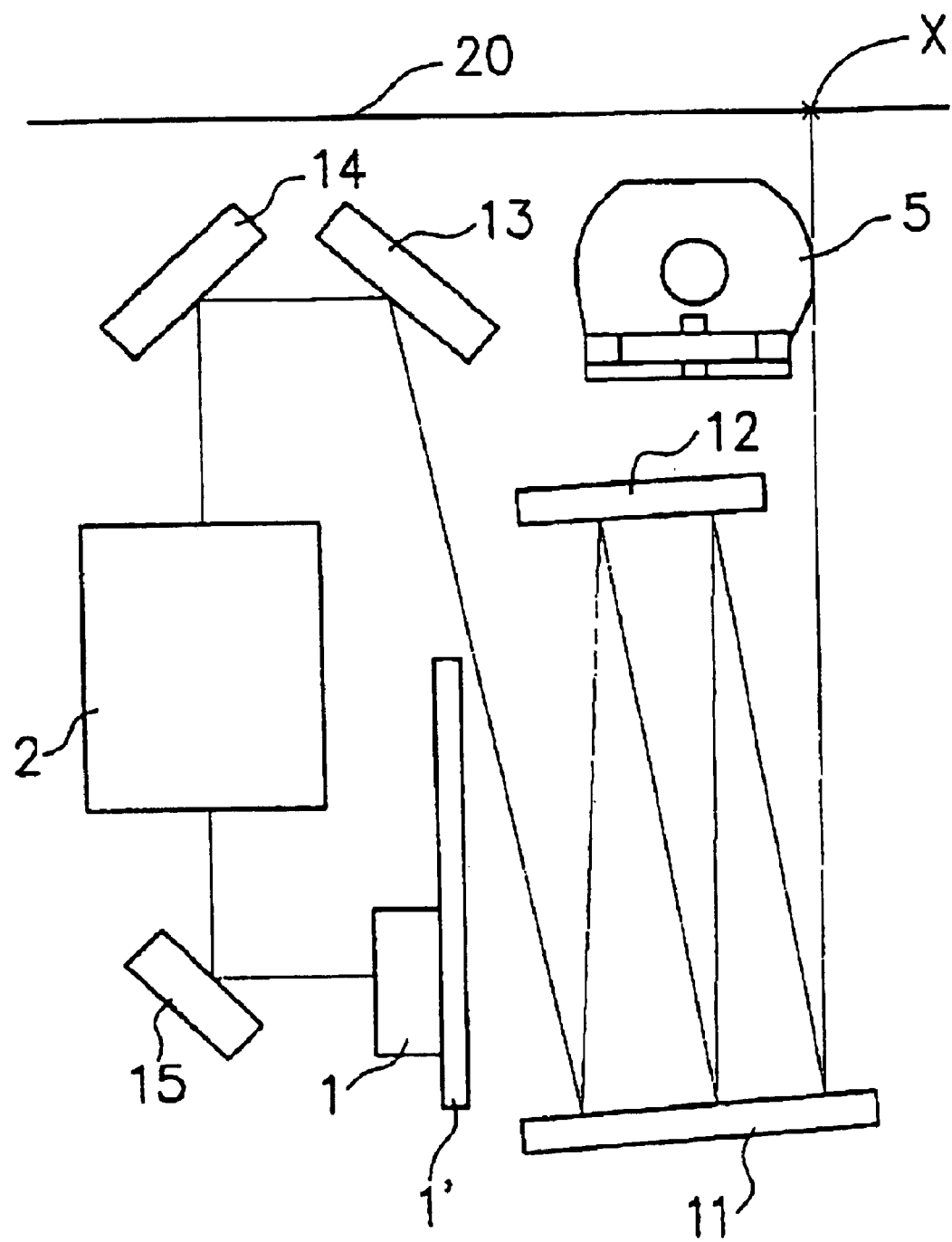
FIG. 1 is a view showing a first embodiment of the scanning module in accordance with the present invention.
Figure 2:
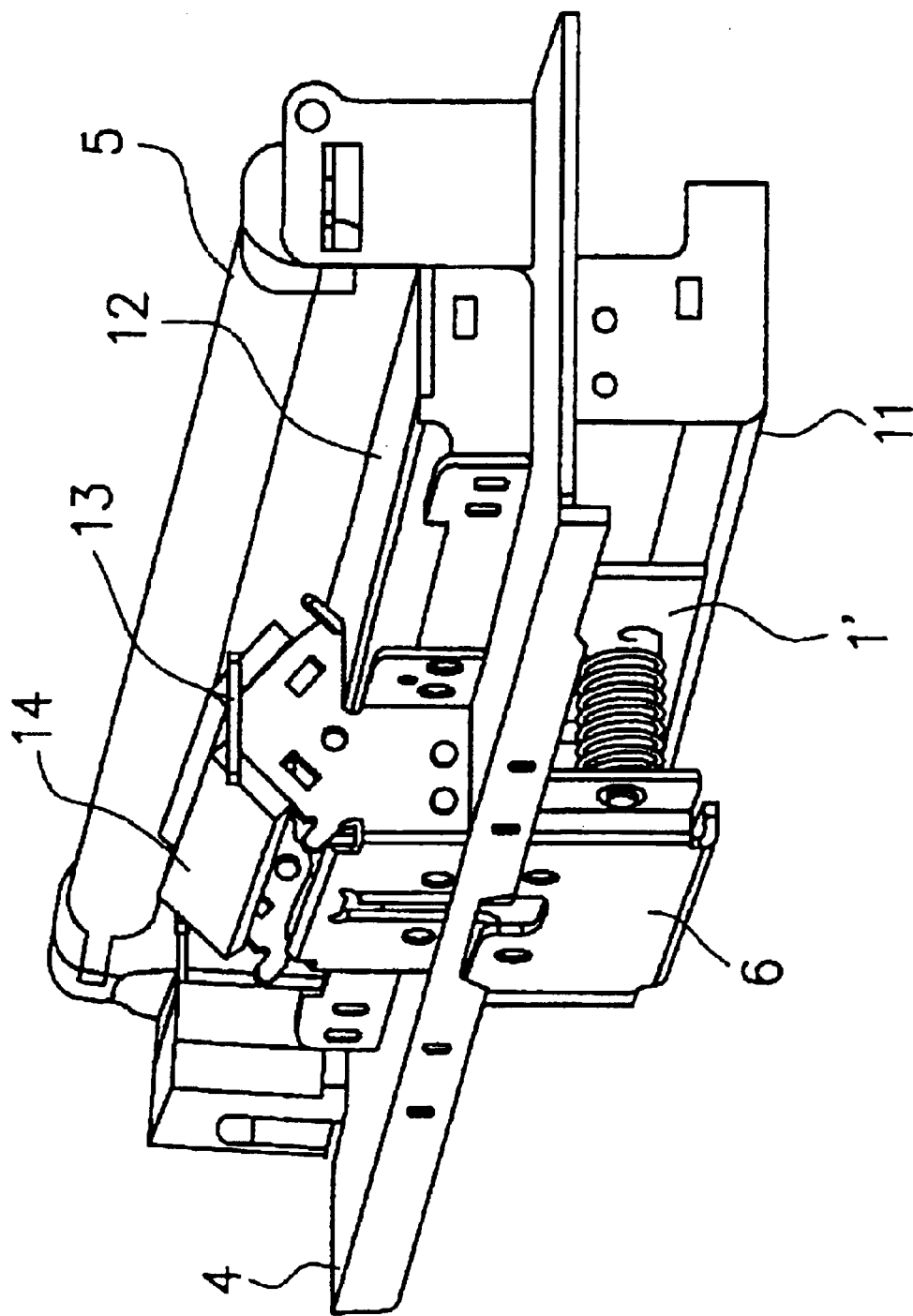
FIG. 2 is an external isometric view of the illustrative embodiment.

Referring to FIGS. 1 and 2 of the drawings, a first embodiment of the scanning module in accordance with the present invention is shown. As shown, the scanning module is generally made up of a linear sensor 1, a package or circuit board 1', a lens 2, a frame 4, a light source 5, and mirrors 11, 12, 13, 14 and 15.

The linear sensor 1 has a plurality of photoelectric transducing devices, which convert incident light to a corresponding electric signal, arranged in an array although not shown specifically. When the light source 5 illuminates a document 20, the resulting imagewise reflection from the document 20 is focused on the linear sensor 1 via the lens 2 and mirrors 11 through 15. The lens 2 and other devices are mounted on the package 1' while the mirrors 11 and 12 are mounted on and positioned by the frame 4.

Figure 3:
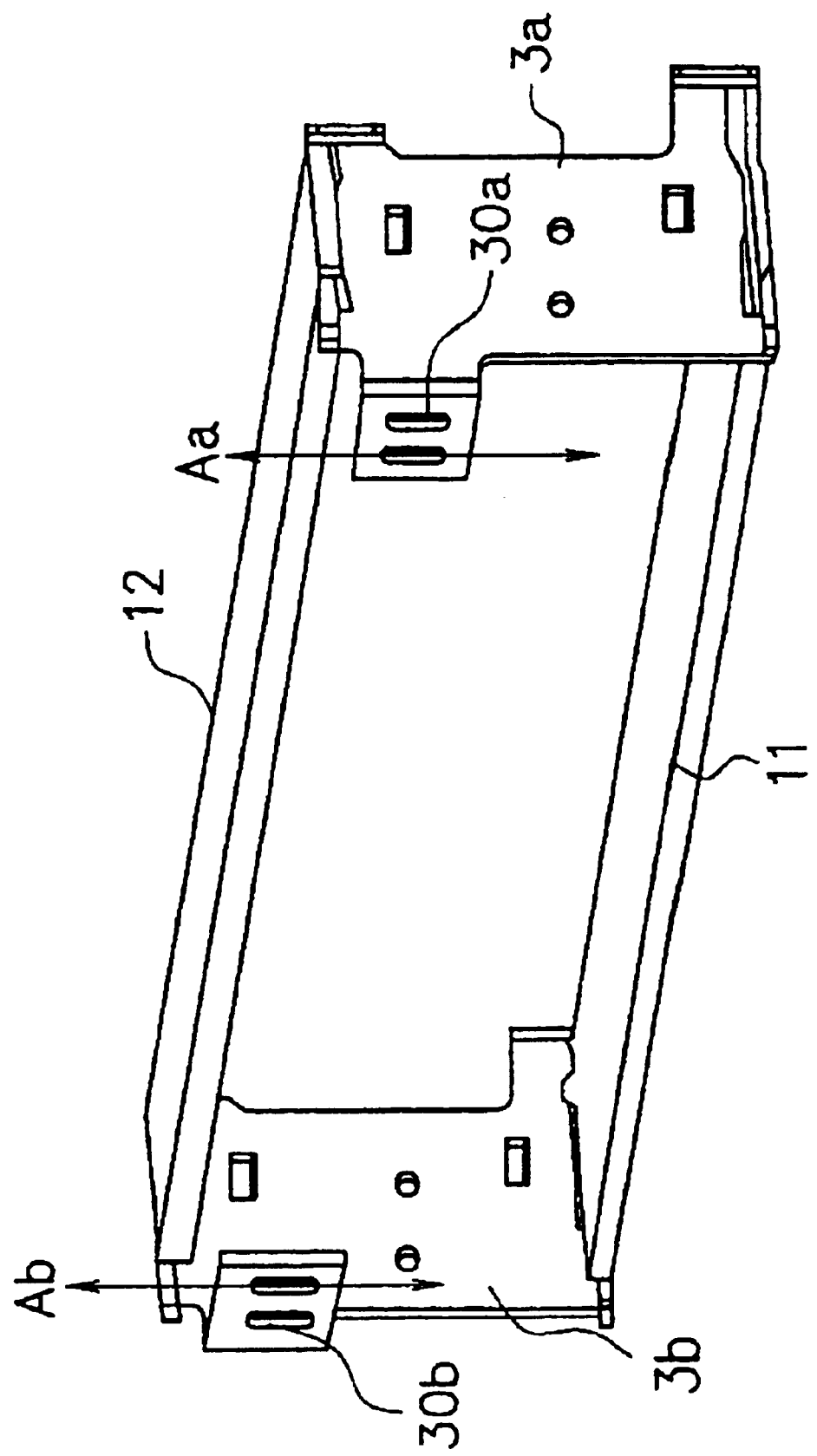
FIG. 3 is a view showing a parallel mirror unit included in the illustrative embodiment.

As shown in FIG. 3, the mirrors 11 and 12 are supported by opposite side walls 3a and 3b substantially in parallel to each other with mirror faces thereof facing each other. Let the unit constituted by the side walls 3a and 3b and mirrors 11 and 12 be referred to as a parallel mirror unit. The side walls 3a and 3b are respectively formed with slots 30a and 30b elongate in the direction perpendicular to the mirror surfaces of the mirrors 11 and 12.

Figure 4:
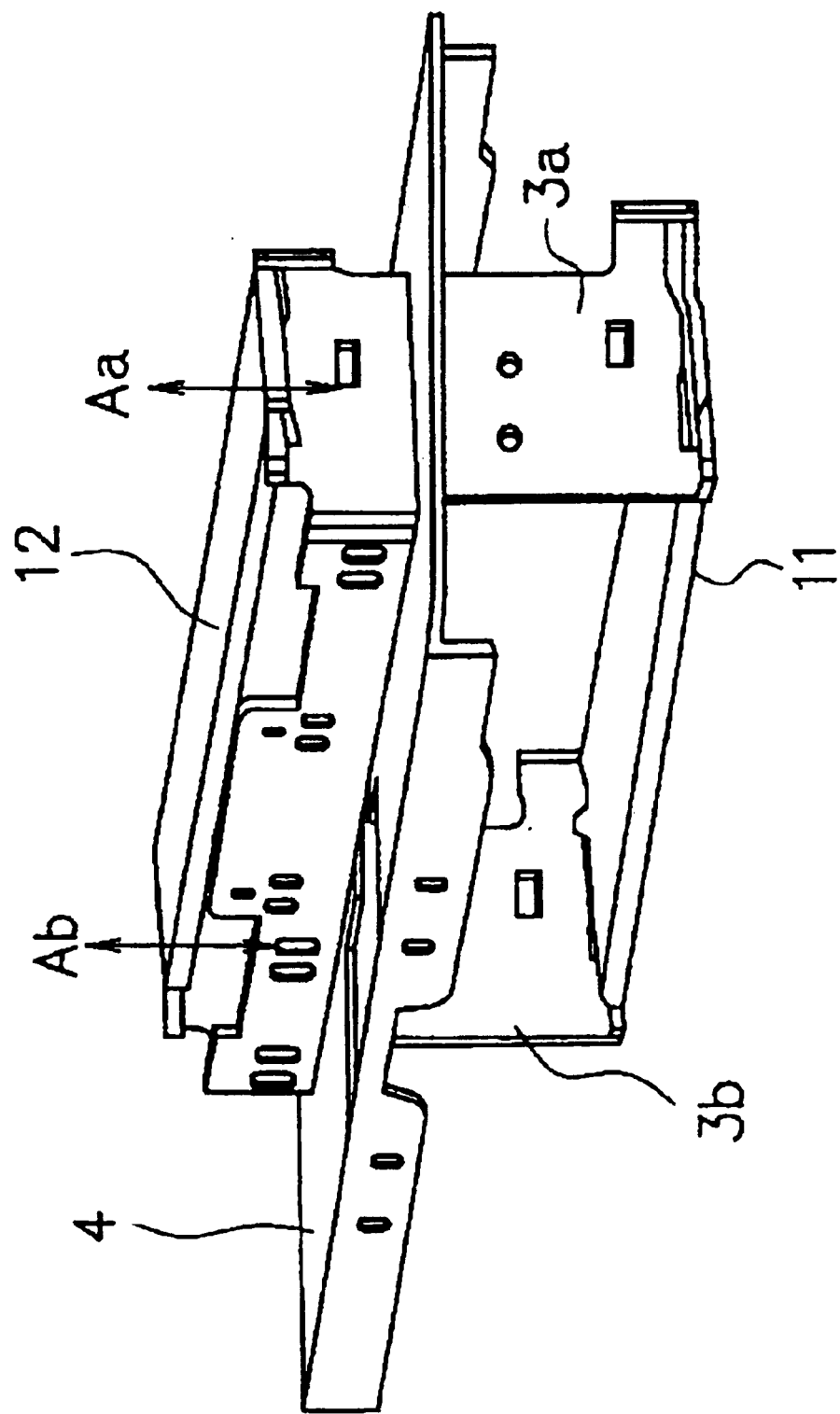
FIG. 4 is a view showing the parallel mirror unit mounted on a frame also included in the illustrative embodiment.

As shown in FIG. 4, the parallel mirror unit is fastened to the frame 4 by screws passed through the slots 30a and 30b. In this configuration, the position where the parallel mirror unit is mounted on the frame 4 is adjustable in the lengthwise direction of the slots 30a and 30b, as indicated by arrows Aa and Ab in FIGS. 3 and 4.

Figure 5:
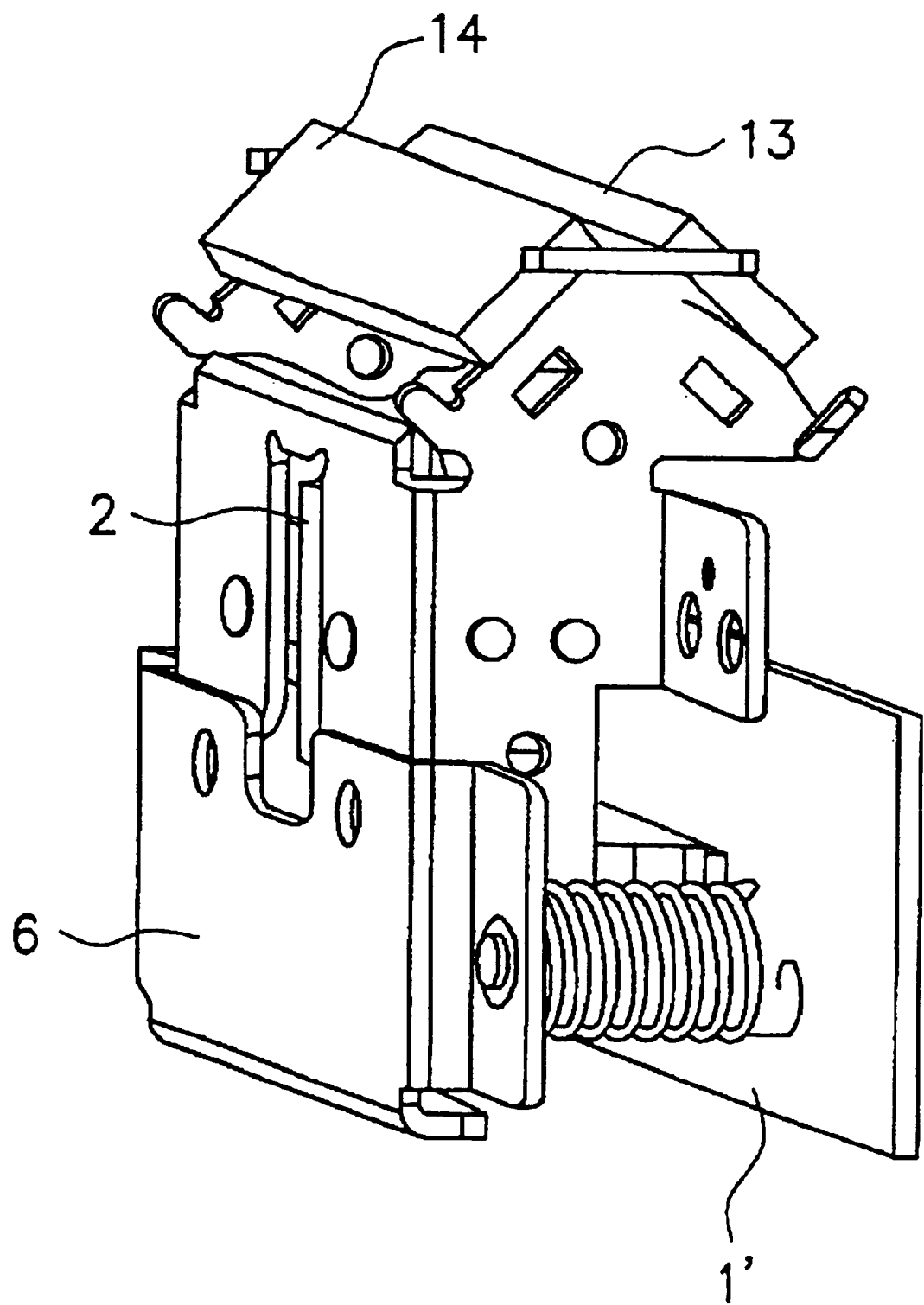
FIG. 5 is a view showing a sensor unit further included n the illustrative embodiment.

As shown in FIG. 5, the package 1', lens 2 and mirrors 13, 14 and 15 are mounted on a frame 6 although the mirror 15, positioned at the rear of the frame 6, is not visible. The unit made up of the package 1', lens 2, frame 6 and mirrors 13 through 15 will be referred to as a sensor unit hereinafter. The sensor unit is affixed to the frame 4 at a preselected position and therefore connected to the parallel mirror unit via the frame 4.

Referring again to FIG. 1, light, issuing from the light source 5 and reflected from a focus X on the document 20, is input to the parallel mirror unit, which includes the mirrors 11 and 12 substantially parallel to the document 20 and to each other. In the parallel mirror unit, the light is repeatedly reflected by the mirrors 11 and 12 a plurality of times and then reflected by the mirror 11 toward the mirror 13.

The light incident to the mirror 13 is reflected thereby toward the mirror 14 in substantially parallel to the document 20 away from the parallel mirror unit. The light is then reflected by the mirror 14 in the direction substantially opposite to the direction in which it is reflected toward the mirror 13, i.e., substantially in the direction in which it is propagated from the focus X to the mirror 11.

The light reflected by the mirror 14 is incident to the mirror 15 via the lens 2 and reflected by the mirror 15 toward the linear sensor 1 in the direction substantially opposite to the direction in which it is reflected from the mirror 13 to the mirror 14. The linear sensor 1 outputs an electric signal corresponding to the light incident thereto, thereby reading an image carried on the document.

The mirror 15 reflects the light incident thereto via the lens 2 toward the parallel mirror unit, as stated above. It is therefore possible to effectively use a limited space available in the scanning module for thereby reducing the size of the module.

How the illustrative embodiment allows the length of the optical path, extending from the document 2 to the line sensor 1, to be adjusted will be described hereinafter. To implement a designed optical magnification, it is necessary to adjust the length of the above optical path to preselected length.

Figure 6:
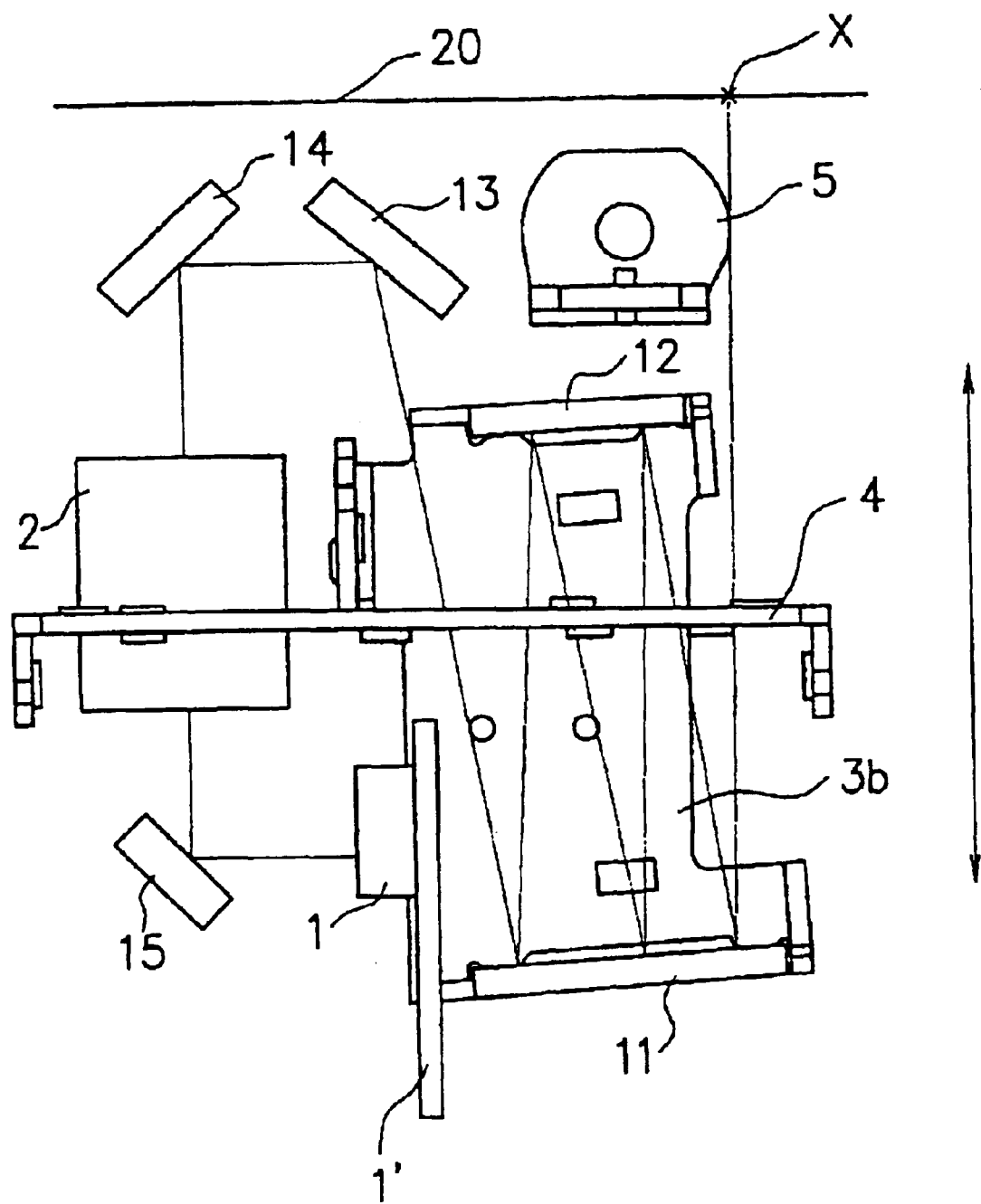
FIG. 6 is a view demonstrating the adjustment of optical path length unique to the illustrative embodiment.

The illustrative embodiment allows the length of the optical path to be adjusted by varying the position where the parallel mirror unit is mounted on the frame 4. More specifically, as shown in FIG. 6, the parallel mirror unit is slidable relative to the frame 4 in parallel to the optical path extending from the document 20 to the mirror 11, as indicated by an arrow. The length of the optical path increase when the parallel mirror unit is slid away from the document 20 or decreases when the former is slid toward the latter. At this instant, the mirrors 11 and 12 remain parallel to each other during such movement and therefore do not have to be readjusted in position individually.

Further, when the parallel mirror unit is moved, as stated above, the distance between the mirror 11 and the document and the distance between the mirrors 11 and 13 vary at the same time. Therefore, the ratio of the amount of displacement of the parallel mirror unit to the amount of variation of optical path length is substantially 1:2. Stated another way, the length of the optical path varies by an amount substantially two times as large as the amount of displacement of the parallel mirror unit. This allows a margin for the adjustment of the above length and therefore the overall size of the scanning module to be reduced.

Moreover, members, including a lens, are absent on the extension of the optical path extending from the document 20 to the mirror 11 on which the reflection is incident first. It is therefore possible to provide the above optical path with the maximum length allowable in relation to the dimensions of the scanning module. It follows that the light reflected from the document 20 is more reduced in size before reaching the mirror 11, allowing the mirror 11, among others, to be reduced in size.

As stated above, the scanning module of the illustrative embodiment implements easy adjustment of optical path length and has a miniature configuration.

Figure 7:
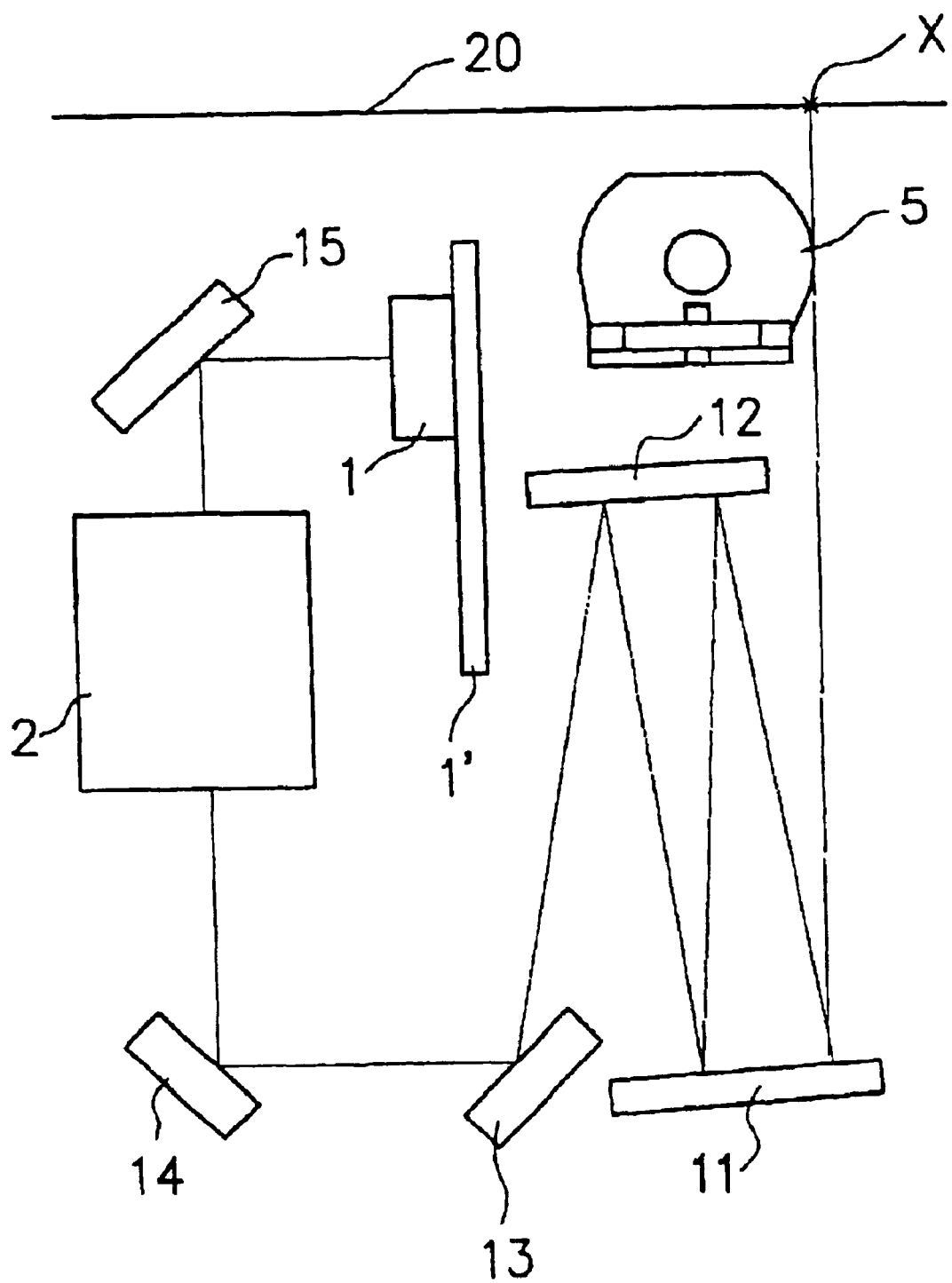
FIG. 7 is a view showing a second embodiment of the present invention.

FIG. 7 shows a second embodiment of the scanning module in accordance with the present invention. Because the second embodiment to be described hereinafter is generally similar to the first embodiment, identical structural elements are designated by identical reference numerals and will not be described specifically in order to avoid redundancy.

The mirrors 11 and 12 shown in FIG. 7 are supported by the side walls 3a and 3b, FIG. 3, in exactly the same manner as in the first embodiment, constituting the parallel mirror unit. Also, the parallel mirror unit is fastened to the frame 4 by screws via the slots 30a and 30b, FIG. 3, formed in the side walls 3a and 3b. The sensor unit is affixed to the frame 4 as in the first embodiment and therefore connected to the parallel mirror unit via the frame 4.

As shown in FIG. 7, in the illustrative embodiment, the parallel mirror unit and sensor unit are connected to each other in the direction opposite to the direction shown in FIG. 2. More specifically, in the external view shown in FIG. 2, only the sensor unit of the illustrative embodiment is inverted in the up-and-down direction.

In operation, the light, reflected from the focus X on the document 20, is input to the parallel mirror unit, which includes the mirrors 11 and 12, and then repeatedly reflected by the mirrors 11 and 12 a plurality of time in the same manner as in the first embodiment. Subsequently, the light is reflected by the mirror 12 toward the mirror 13.

The light incident to the mirror 13 is reflected thereby toward the mirror 14 in substantially parallel to the document 20 away from the parallel mirror unit. The light is then reflected by the mirror 14 in the direction substantially opposite to the direction in which it is reflected toward the mirror 13, i.e., substantially in the direction in which it is propagated from the focus X to the mirror 11.

The light reflected by the mirror 14 is incident to the mirror 15 via the lens 2 and reflected by the mirror 15 toward the linear sensor 1 in the direction substantially opposite to the direction in which it is reflected from the mirror 13 to the mirror 14. The linear sensor 1 outputs an electric signal corresponding to the light incident thereto, thereby reading the image of the document.

The illustrative embodiment allows optical path length to be adjusted in exactly the same manner as the previous embodiment and therefore achieves the same advantages as the first embodiment.

Figure 8:
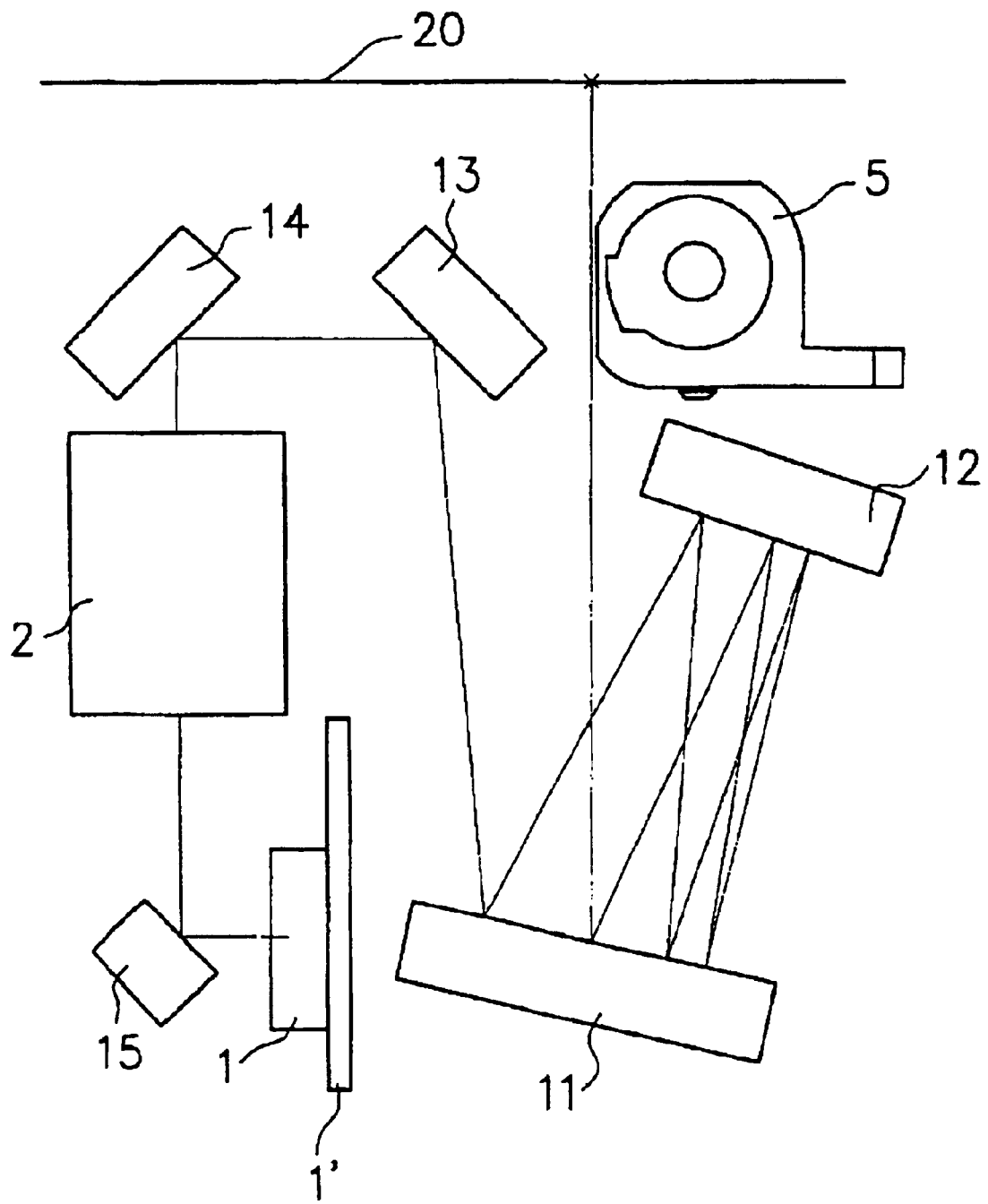
FIG. 8 is a view showing a third embodiment of the present invention.

FIG. 8 shows a third embodiment of the scanning module in accordance with the present invention. Because the third embodiment is also generally similar to the first embodiment, identical structural elements are designated by identical reference numerals and will not be described specifically in order to avoid redundancy. Let the following description concentrate on differences between the first and third embodiments.

As shown in FIG. 8, in the illustrative embodiment, the mirrors 11 and 12 are not parallel to each other, but are inclined such that the distance therebetween is greater at one side where the reflection from the document 20 is incident, i.e., the side close to the package 1' than the other side. Also, the mirrors 11 and 12 are parallel to the document 20 in the lengthwise direction, but are inclined by a preselected angle relative to the document 20 in the widthwise direction.

The operation of the illustrative embodiment is identical with the operation of the first embodiment except for the following. Although the light reflected from the document 20 is incident to the parallel mirror unit including the mirrors 11 and 12 as in the first embodiment, the light is turned back while being repeatedly reflected by the mirrors 11 and 12 because the mirrors 11 and 12 are inclined, as stated earlier. As a result, the light is reflected from the side where it is incident to the mirror 11 toward the mirror 13. This is followed by the same optical path as in the first embodiment.

The illustrative embodiment also achieves the same advantages as the first embodiment. Further, in the illustrative embodiment, the parallel mirror unit is configured such that the light incident thereto is repeatedly reflected between the mirrors 11 and 12 and again output from the incidence side. Stated another way, the mirrors 11 and 12 are inclined such that the light incident to the parallel mirror unit is turned back to the incidence side. This configuration is successful to increase the number of times of reflection in the parallel mirror unit and therefore to reduce the size of the individual member included in the sensor unit.

It is to be noted that the number of times of reflection between the mirrors 11 and 12 shown and described in the illustrative embodiments is only illustrative, but not restrictive. Also, the configuration of the individual member shown and described is only illustrative. For example, while the slots 30a shown in FIG. 3 are formed in a projection protruding from the side wall 3a substantially perpendicularly thereto, the slots 30a may, of course, be positioned in substantially the same plane as the side wall 3a. This is also true with the slots 30b formed in the other side wall 3b. Further, the parallel mirror unit maybe directly connected to the frame 6 without the intermediary of the frame 4.

In summary, it will be seen that the present invention provides a scanning module having various unprecedented advantages, as enumerated below.

(1) The scanning module is small size because light is reflected between a pair of mirrors a plurality of times.

(2) The pair of mirrors can be adjusted in position without their positional relation disturbed, allowing the length of an optical path to be easily varied.

(3) An optical path, extending from the pair of mirrors, is folded in the form of a Japanese character "の" or an alphabet "G", further reducing the size of the scanning module.

(4) Only the pair of mirrors are fixed in position by an exclusive member independently of the other mirrors, so that the mirrors around a lens, i.e., other than the pair of mirrors can be fixed in position by another member. It follows that the mirrors around the lens to which the light, repeatedly reflected by the pair of mirrors, is incident can be made smaller in size than the pair of mirrors, contributing to the cost reduction of the scanning module. In addition, such mirrors around the lens save space and allow, e.g., an electronic circuit board to be arranged in the resulting unoccupied space.

Various modifications will become possible for those skilled in the art after receiving the teachings of the present disclosure without departing from the scope thereof.

What is claimed is:

1. A scanning module comprising:
  a light source configured to illuminate a document to be scanned;
  a pair of mirrors comprising a first mirror to which light reflected by the document is incident and a second mirror positioned substantially parallel to and spaced by a preselected distance from said first mirror, said pair of mirrors reflecting said light a plurality of times therebetween and then outputting said light as light reflected from said first mirror;
  a third mirror configured to reflect the reflected light from said pair of mirror away from said pair of mirrors in substantially parallel to the document;
  a fourth mirror configured to reflect the light incident from said third mirror toward a lens in a direction substantially opposite to a direction in which said light is reflected from said pair of mirrors to said third mirror;
  a fifth mirror configured to reflect the light incident from the lens in a direction substantially opposite to a direction in which said light is reflected from said third mirror to said fourth mirror; and
  a linear sensor spaced from said fifth mirror by a preselected distance such that the light passed through the lens is focused on said linear sensor;
  wherein said pair of mirrors are adjustable in position on a path extending from the document to said first mirror while maintaining a positional relation between said first mirror and said second mirror.

2. The scanning module as claimed in claim 1, wherein said first mirror and said second mirror are maintained substantially parallel to each other by being affixed to flat members at opposite ends thereof in a widthwise direction, and
  said pair of mirrors are positioned by being fastened to said flat members by screws passed through slots, which are formed in said flat members and elongate in a direction substantially coincident with a direction of an optical path extending from the document to said fist mirror.

3. The scanning module as claimed in claim 1, wherein said first mirror and said second mirror are substantially perpendicular to an optical path extending from the document.

4. The scanning module as claimed in claim 3, wherein said first mirror and said second mirror are maintained substantially parallel to each other by being affixed to flat members at opposite ends thereof in a widthwise direction, and
  said pair of mirrors are positioned by being fastened to said flat members by screws passed through slots, which are formed in said flat members and elongate in a direction substantially coincident with a direction of an optical path extending from the document to said fist mirror.

5. A scanning module comprising:
  a light source configured to illuminate a document to be scanned;
  a pair of mirrors comprising a first mirror to which light reflected by the document is incident and a second mirror positioned substantially parallel to and spaced by a preselected distance from said first mirror, said pair of mirrors reflecting said light a plurality of times and then outputting said light as light reflected from said second mirror;
  a third mirror configured to reflect the light output from said pair of mirrors away from said pair of mirrors in substantially parallel to the document;
  a fourth mirror configured to reflect the light incident from said third mirror toward a lens in a direction substantially opposite to a direction in which said light is reflected from said pair of mirrors to said third mirror;
  a fifth mirror configured to reflect the light incident from the lens in a direction substantially opposite to a direction in which said light is reflected from said third mirror to said fourth mirror; and
  a linear sensor spaced from said fifth mirror by a preselected distance such that the light passed through the lens is focused on said linear sensor;
  wherein said pair of mirrors are adjustable in position on a path extending from the document to said first mirror while maintaining a positional relation between said first mirror and said second mirror.

6. The scanning module as claimed in claim 5, wherein said first mirror and said second mirror are maintained substantially parallel to each other by being affixed to flat members at opposite ends thereof in a widthwise direction, and
  said pair of mirrors are positioned by being fastened to said flat members by screws passed through slots, which are formed in said flat members and elongate in a direction substantially coincident with a direction of an optical path extending from the document to said fist mirror.

7. The scanning module as claimed in claim 5, wherein said first mirror and said second mirror are substantially perpendicular to an optical path extending from the document.

8. The scanning module as claimed in claim 7, wherein said first mirror and said second mirror are maintained substantially parallel to each other by being affixed to flat members at opposite ends thereof in a widthwise direction, and
  said pair of mirrors are positioned by being fastened to said flat members by screws passed through slots, which are formed in said flat members and elongate in a direction substantially coincident with a direction of an optical path extending from the document to said fist mirror.

9. A scanning module comprising:

a light source configured to illuminate a document to be scanned;

a pair of mirrors comprising a first mirror to which light reflected by the document is incident and a second mirror positioned substantially parallel to and spaced by a preselected distance from said first mirror, said pair of mirrors reflecting said light a plurality of times and then outputting said light as light reflected from said first mirror;

a third mirror configured to reflect the light output from said pair of mirrors away from said pair of mirrors in substantially parallel to the document;

a fourth mirror configured to reflect the light incident from said third mirror toward a lens in a direction substantially opposite to a direction in which said light is reflected from said pair of mirrors to said third mirror;

a fifth mirror configured to reflect the light incident from the lens in a direction substantially opposite to a direction in which said light is reflected from said third mirror to said fourth mirror; and a linear sensor spaced from said fifth mirror by a preselected distance such that the light passed through the lens is focused on said linear sensor;

wherein said pair of mirrors are adjustable in position on a path extending from the document to said first mirror while maintaining a positional relation between said first mirror and said second mirror, said first mirror and said second mirror are inclined by a preselected angle relative to the optical path, which extends from the document, such that a distance between ends of said first mirror and said second mirror close to said third mirror and said document decreases, a distance between said first mirror and said second mirror being greater at a side close to said third mirror than at the other side by a preselected amount, and the light from the document is incident to said first mirror at the side close to said third mirror, reflected between said first mirror and said second mirror a plurality of times, and then output from said side close to said third mirror.

10. The scanning module as claimed in claim 9, wherein said first mirror and said second mirror are affixed to flat members at opposite ends thereof in a widthwise direction such that the distance between said first mirror and said second mirror is greater at the side close to said third mirror than at the other side by the preselected amount, and said pair of mirrors are positioned by being fastened to said flat members by screws passed through slots, which are formed in said flat members and elongate in a direction substantially coincident with a direction of an optical path extending from the document to said fist mirror.

* * * * *